United States Patent Office 3,510,796
Patented May 5, 1970

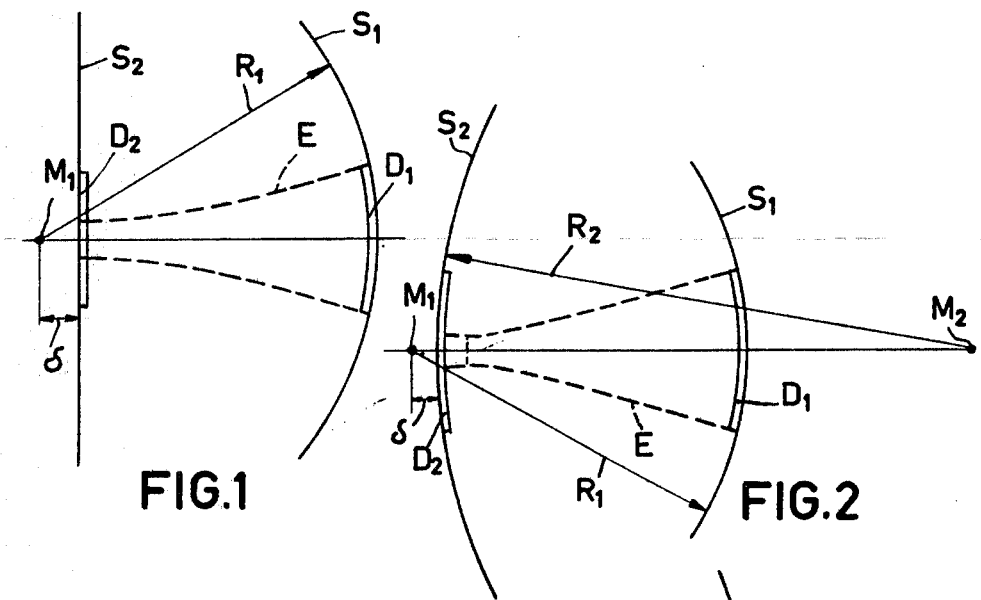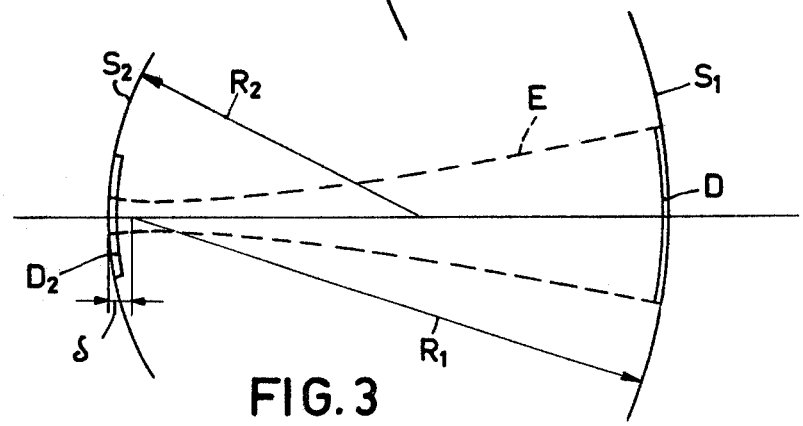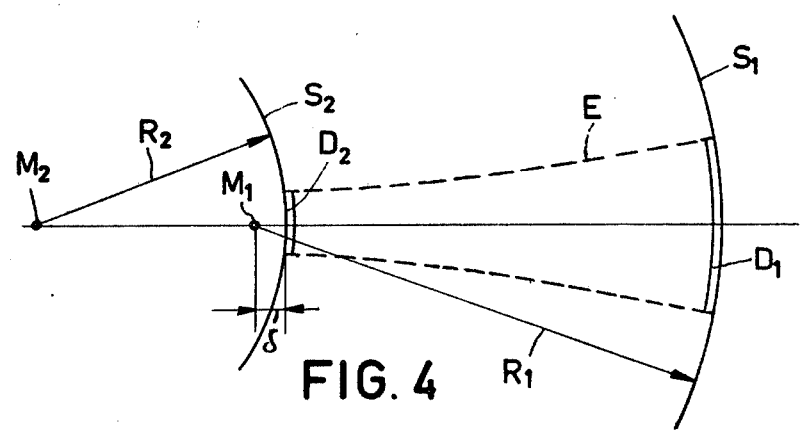

3,510,796
GAS LASER HAVING A CONICAL CHANNEL
Gerardus Joseph Marie Ahsmann, Emmasingel, Eindhoven, Netherlands, assignor, by mesne assignments, to U.S. Philips Corporation, New York, N.Y., a corporation of Delaware
Filed June 1, 1965, Ser. No. 460,030
Claims priority, application Netherlands, June 2, 1964, 6406165
Int. Cl. H01s 3/00
U.S. Cl. 331—94.5                 3 Claims

ABSTRACT OF THE DISCLOSURE

A gas laser having a conical ray path and a conical discharge enclosure.

---

This invention relates to gas lasers in which at least one of the two mirrors covered with a dichroic layer for the wavelength of the laser is concave. The center of curvature of this first concave mirror is at a distance from the second mirror which is small relative to the radius of curvature of the first concave mirror and in which the distance of the possible center of curvature of the second mirror from the first mirror is not small relative to the distance between the two mirrors, resulting in a ray path having a cross-section which is small in the vicinity of the second mirror relative to that at the first concave mirror.

In the arrangement above described, the second mirror may be either plane or convex with the center of curvature of the first mirror at a short distance behind it. The second mirror may alternatively be concave, in which events the center of curvature of the first mirror may be located either in front of or behind it.

In gas lasers the aim is to concentrate a maximum amount of energy in the beam of the laser light. The intensity of the beam depends not only upon the current density in the discharge but also upon the difference in population of the various levels of the gas in which the discharge occurs, which levels are correlated indirectly or directly to the laser transition. The difference between the populations depends inter alia upon the geometry of the discharge space.

An object of the invention is to provide a laser of the kind mentioned in the preamble which permits an increased intensity of the laser light.

According to the invention, in a gas laser in which at least one of the two mirrors covered with a dichroic layer for the wave-length of the laser is concave with the center of curvature of this first concave mirror at a distance from the second mirror which is small relative to the radius of curvature of the first concave mirror. The distance of the possible center of curvature of the second mirror from the first mirror is not small with respect to the distance between the two mirrors, resulting in a ray path having a cross-section which is small in the vicinity of the second mirror relative to the cross-section at the first concave mirror. The discharge occurs in a channel of insulating material having a cross-section which varies substantially in accordance with the path of rays in that portion of the light path along which the discharge occurs.

The envelope of the ray path in lasers to which the invention relates is a portion of a single-blade hyperboloid of revolution having its narrowest portion near the second mirror. Only the portion of the discharge which is bounded by said envelope takes part in the action of the laser. Due to the channel of insulating material provided in accordance with the invention, the discharge is in practice limited to that portion of the space in which the ray path occurs. A pressure may be chosen in the narrower portion of the channel which is higher than in a wide channel so that a higher population of the levels favourable for the action of the laser occurs at the higher current density.

The metastable and any other excited gas atoms are led back more rapidly to the ground state in the narrow portion of the discharge than in the case of a wide cylindrical discharge space. Due to the lower population of the metastable level, even the lowest levels engaged in the action of the laser can acquire a lower population, resulting in an increased action of the laser.

The pressure in the gas is adjusted for optimum action of the laser in the narrow portion of the discharge so that the optimum action is not unduly deviated from even in the wide portion. This is possible in view of the flat variation of the required pressure as a function of the current density. For adjusting the pressure, allowance has to be made for the cataphoretic demixing through a direct-current discharge in the asymmetrical envelope of the discharge path.

According to the invention, it is preferable for practical reasons to shape the channel of insulating material not exactly into the form of a single-blade hyperboloid since the manufacture thereof is comparatively expensive and a small distance from the ray path must be maintained in view of interference due to reflections. Instead thereof the shape may be sufficiently approximated with a conical channel which encloses the ray path with an interspace of approximately 1 mm. at its ends.

It has been found that, with constructions according to the invention, a considerable increase in the intensity of the laser light may be obtained with mixtures, such as helium and neon, as well as with a single gas such as neon.

In order that the invention may be readily carried into effect, it will now be described in detail, by way of example, with reference to the accompanying diagrammatic drawings, in which:

FIGS. 1 to 4 show a number of fundamentally possible arrangements according to the invention;

In FIGS. 1 to 4 the first and second mirrors are indicated by $S_1$ and $S_2$ respectively. The first mirror is invariably concave and the second mirror is either plane or concave or convex. The centers of curvature of the mirrors are indicated by $M_1$ and $M_2$, the radii of curvature by $R_1$ and $R_2$ and the dichroic layers by $D_1$ and $D_2$. The envelope of the path ray is shown in broken line and indicated by E. The distance between the center of curvature $M_1$ and $S_2$ is indicated by $\delta$.

Figure 5:
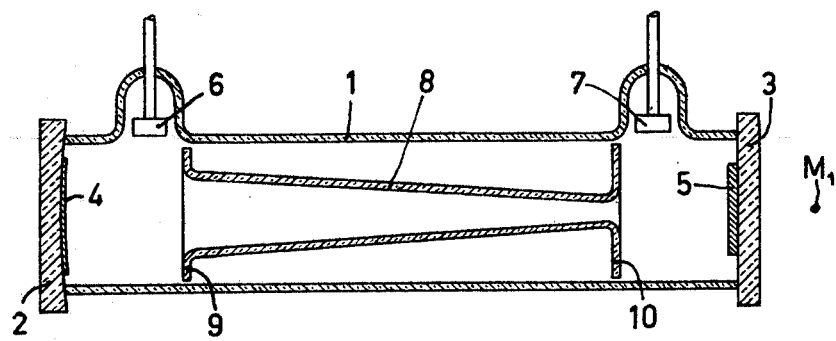
FIG. 5 shows a practical embodiment of the arrangement of FIG. 1.

FIG. 5 shows a glass tube 1 of 1 metre long having at its ends a concave mirror 2 and a plane mirror 3. The radius of curvature of the concave mirror is 1036 mms. The two mirrors are covered with dichroic layers 4 and 5 respectively for a wave-length of approximately 0.63μ. Discharge electrodes 6 and 7 are housed in protuberances of the tube 1. Inside the tube 1 is a conical glass tube 8 having supporting flanges 9 and 10. The largest aperture of the conical tube is 7 mms. and its smallest aperture is 2.5 mms. The tube is filled with a mixture of helium and 10% of neon at a pressure of approximately 1 mm. mercury. If a direct-current discharge having a current strength of from 25 to 50 ma. is passed through the tube at an operating voltage of approximately 3000 volts, it is possible by means of the mirrors 2 and 3 to obtain divergent and convergent laser beams, respectively, of several tens of milliwatts if the tube 1 is bent slightly by means of a simple device, otherwise not shown, for correctly centering the mirrors with respect to one another. The output is more than doubled as compared with a laser comprising a glass tube of cylindrical shape which surrounds the whole of the ray path.

Figure 6:
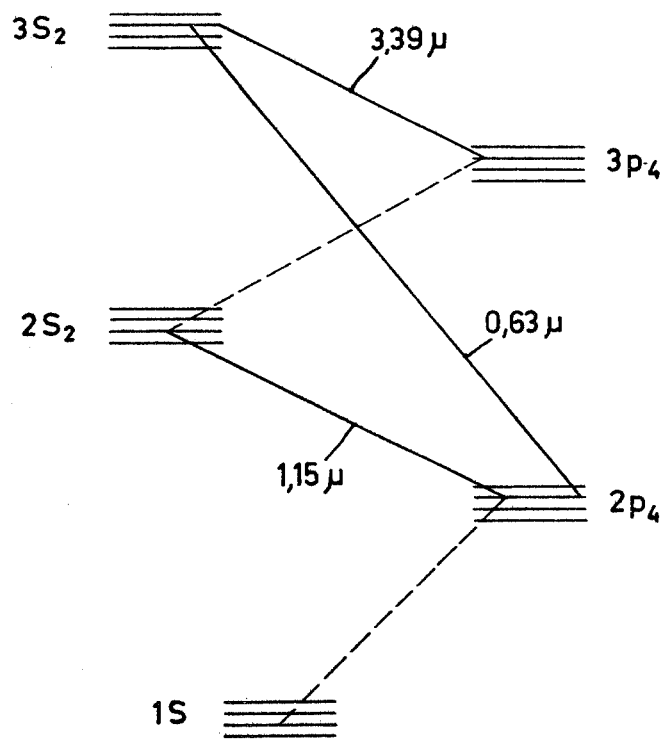
FIG. 6 shows the level diagram of neon in connection with the laser transitions.

FIG. 6 shows the levels associated with the know laser transitions of neon and in full lines the laser transitions, the wave-lengths of the laser light also being specified. The non-laser transitions are shown in broken lines, special attention being drawn to the transition from the $2p_4$ level to the metastable 1S level. The lower the population of the 1S levels, the lower will also be the population of the $2p_4$ level and the higher the intensity of the transition from $3S_2$ to $2p_4$, which produces the red light having a wave-length of $0.63\mu$ in the laser shown in FIG. 5. The vicinity of the conical wall 8 in FIG. 5 causes the population of the levels 1S to be maintained as low as possible throughout the length of the discharge tube.

What is claimed is:

1. A gas laser device for generating a laser beam along a light path comprising two laser discharge mirrors, at least one of the two mirrors being covered with a dichroic layer corresponding to the wave-length of the laser, said one of the two mirrors being concave with a center of curvature located at a distance from the other of said two mirrors which is small relative to the radius of curvature of said one of said two mirrors and in which the distance of the center of curvature of said other of said two mirrors from said one of said two mirrors is at least equal to or greater than the distance between the two mirrors, resulting in a ray path having a cross section which is small in the vicinity of the second mirror relative to the cross-section of the ray path at said one of said two mirrors, said laser including a discharge channel of insulating material having a cross-section which varies substantially in accordance with the ray path in that portion of the light path along which the discharge occurs wherein the discharge channel is surrounded by a cylindrical tube having closed ends which support the respective mirrors at the respective ends of the discharge channel, said tube being filled with a mixture of helium and neon.

2. A gas laser as claimed in claim 1 wherein the pressure of the gas in the discharge corresponds to the pressure at which optimum action of the laser occurs in the narrow portion of the channel.

3. A gas laser as claimed in claim 1 wherein the channel of insulating material has a conical shape.

References Cited

UNITED STATES PATENTS 3,137,827   6/1964   Pierce _____ 391—94.5

RONALD L. WIBERT, Primary Examiner

U.S. Cl. X.R.

330—4.3